(12) United States Patent
Owen

(10) Patent No.: US 6,556,877 B1
(45) Date of Patent: Apr. 29, 2003

(54) TIMED MULTI-FUNCTION DIGITAL INTERFACE

(75) Inventor: Bryn R. Owen, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,808

(22) Filed: Aug. 16, 1999

(30) Foreign Application Priority Data

Aug. 14, 1998 (CA) .............................................. 2245118

(51) Int. Cl.$^7$ .............................................. G05B 15/00
(52) U.S. Cl. .............................. 700/75; 700/14; 700/74; 713/502; 377/2
(58) Field of Search .............................. 700/75, 14, 73, 700/74, 76, 77; 345/163; 713/500–502; 377/2, 26; 348/732

(56) References Cited

U.S. PATENT DOCUMENTS

| | | | | |
|---|---|---|---|---|
| 4,220,970 A | * | 9/1980 | Haraszti et al. | 348/732 |
| 4,399,354 A | * | 8/1983 | Schaeffer | 377/26 |
| 5,341,421 A | * | 8/1994 | Ugon | 345/163 |

* cited by examiner

Primary Examiner—Leo Picard
Assistant Examiner—Steven R. Garland
(74) Attorney, Agent, or Firm—Ronald L. Drumheller

(57) ABSTRACT

In a data processing system a method and apparatus is provided for discriminating between digital signals of a plurality of different rates by monitoring the pulse width and repetition rate of such signals. The digital signals are continuously monitored to determine whether a single pulse or multiple pulses have been detected within a preselected time period. If only a single pulse or a portion thereof has been detected within the preselected time period a first type of control signal is generated. If multiple pulses or portions of multiple pulses have been detected within the preselected time period a second type of control signal is generated.

4 Claims, 12 Drawing Sheets

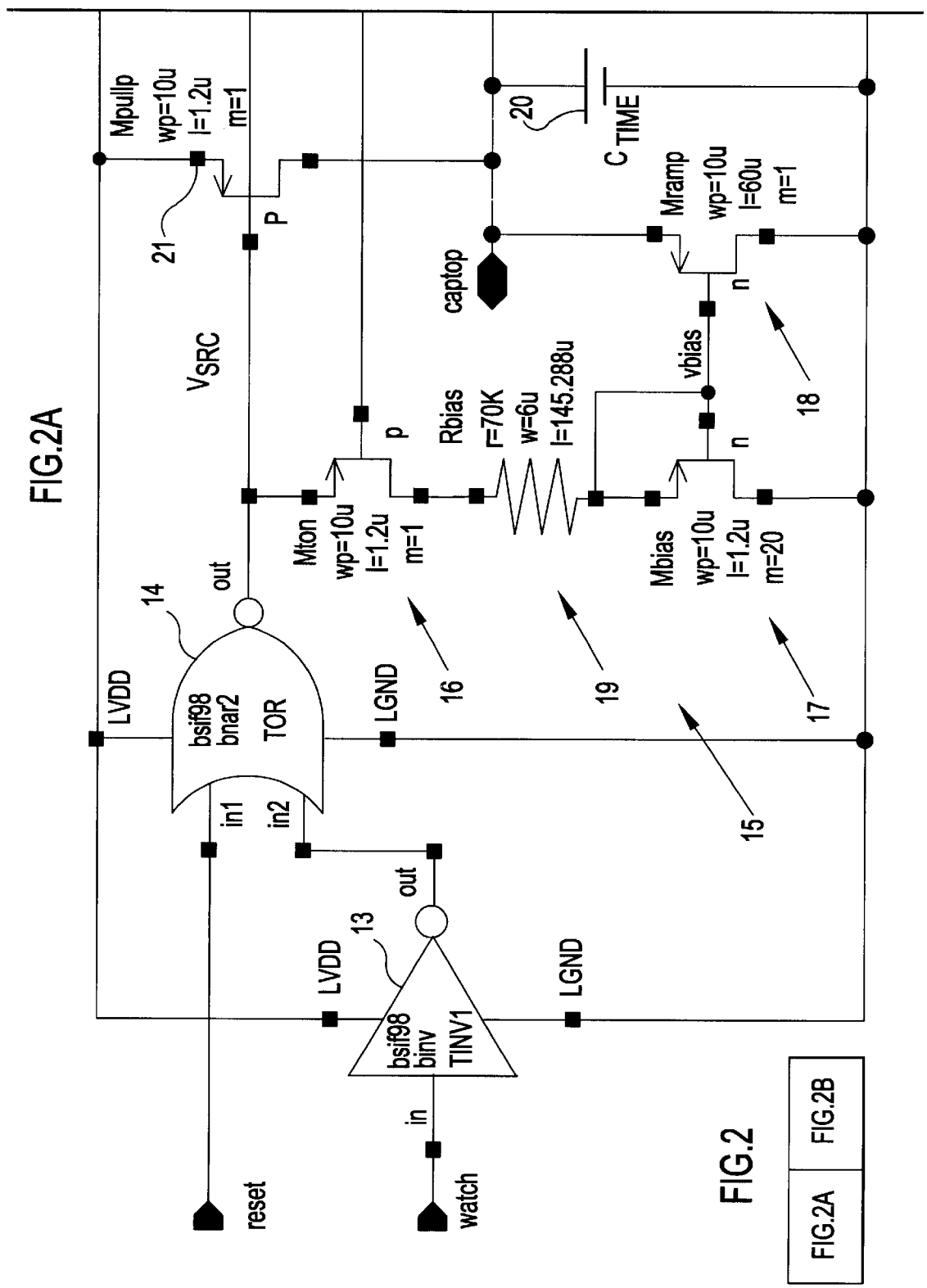

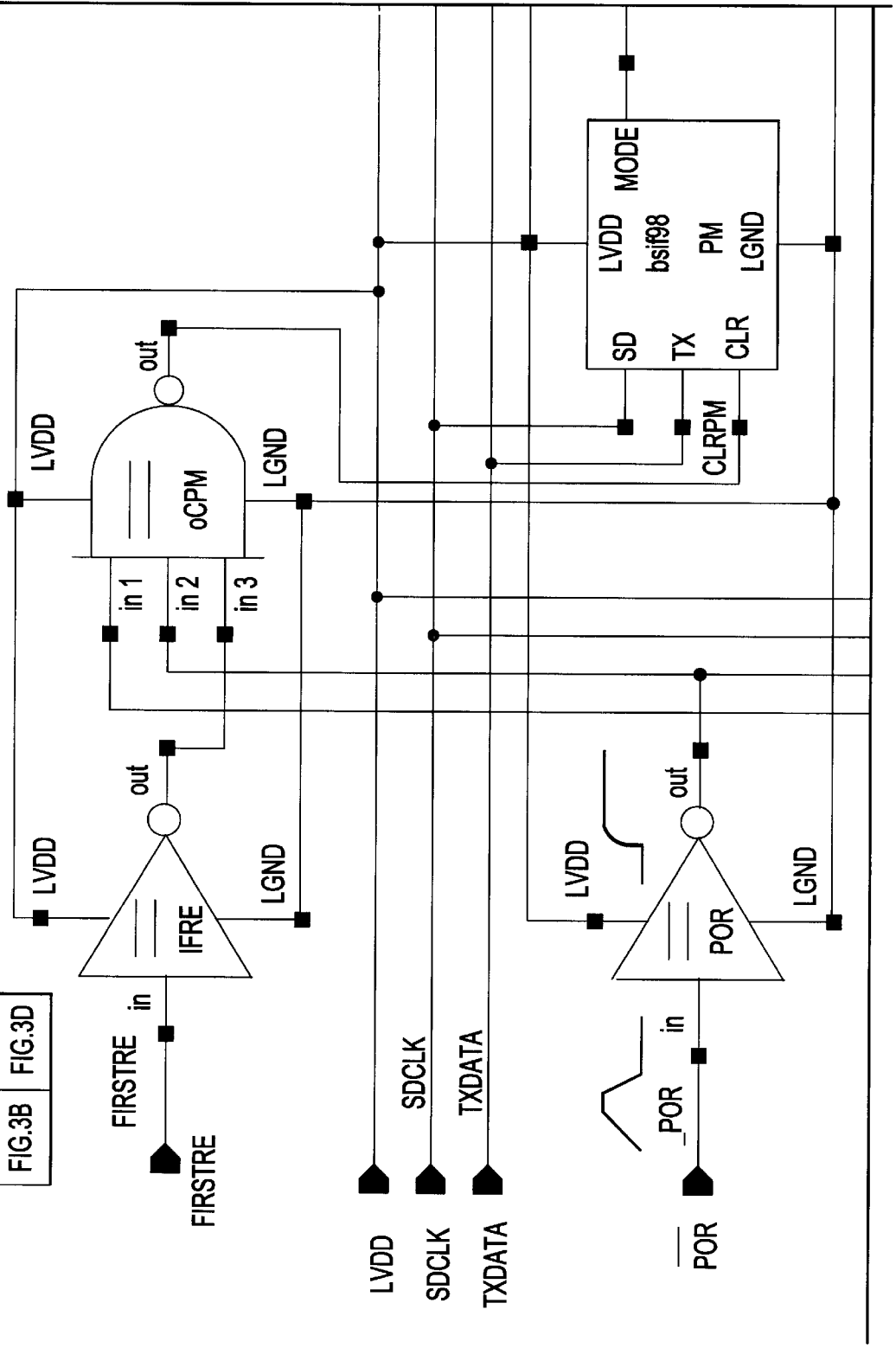

TIMED MULTI-FUNCTION DIGITAL INTERFACE

BACKGROUND OF THE INVENTION

Field of the Invention

The invention relates to the field of integrated circuits and more particularly to the access of multiple functions or circuits of an integrated circuit from a limited number of input or output terminals of the integrated circuit.

For compact integrated circuits used in modern technology, especially for miniaturized devices such as those powered by batteries or used in laptop computers, it is often necessary to combine many functions into a small amount of (silicon) die area used in the integrated circuits and provide the functionality using the simplest interface with the least number of external connections or (terminal) pins.

In particular as new technology supplants older technology there may be a need to provide backward compatibility of integrated circuits so that new integrated circuit components can be used in place of old components, such as in the repair of older equipment, second sourcing of parts, or in the manufacture of different models of equipment where different functions may be activated through common terminals or pins on integrated circuits.

For instance, in the wireless data communication used in communications by some computers infrared standards have been adopted at certain points in time and then subsequently upgraded for improved communications. This has required improved integrated circuits and advanced programming to replace older hardware and software applications (which we will call legacy hardware and software ). The proposed standards put forward by the Infrared Data Association (IrDA) have become important for manufacturers to adopt throughout the PC industry due to wide acceptance of their infrared communication specifications. Accordingly it may be said that important defacto standards for infrared transceiver components have emerged in the marketplace from the point of view of their electrical signal interfaces.

Because of the presence of older (legacy) equipment and software in the marketplace and the use of the legacy equipment and manufacturers' and customers familiarity and dependence on the older technology problems can arise when a newer generation product is being developed to adopt a more sophisticated digital programming interface (enhanced function) over the original product. Because of the use of the older equipment in the marketplace it has been found important to retain, in new products, the 'look and feel' (from a pinout and electrical interface point of view) of legacy devices. This means that the function of the pins that already had a standard industry mode of operation need to be shared in such that a manufacturer or user who is not interested in new function would see no change in the way they must interface to the device. The term 'legacy mode' has been chosen to describe the original mode of operation that must be transparently supported from user's point of view.

SUMMARY OF THE INVENTION

One aspect of the invention provides for a data processing system a method of discriminating between digital signals of a plurality of different rates by monitoring the pulse width and repetition rate of such signals comprising:

monitoring the digital signals for a preselected period of time;

determining whether only a single pulse or multiple pulses have been detected within the preselected time period; if only a single pulse or a portion thereof has been detected within the preselected time period generating a first type of control signal; if multiple pulses or portions of multiple pulses have been detected within the preselected time period generating a second type of control signal.

In another aspect, if only a single pulse has been detected within the preselected time period further discrimination may be made based on whether the pulse width is shorter or longer than the preselected time period.

If the pulse is less than a predetermined threshold timing period a third type of control signal may be generated, and if the pulse is greater than the predetermined timing period a fourth type of control signal may be generated.

The first type of control signal may be adapted to set the data processing system into a first mode of operation. The second type of control signal may be adapted to set the data processing system into a second mode of operation.

In another aspect, apparatus is provided for controlling a data processing system adapted to operate in a plurality of modes of operation for processing digital signals of a plurality of rates by selecting modes of operation of said system. This includes means for monitoring said digital signals for a preselected period of time; discrimination means for determining whether only a single pulse or multiple pulses have been detected within said preselected time period; control signal generating means for generating a first type of control signal if only a single pulse or a portion thereof has been detected within said preselected time period; control signal generating means for generating a second type of control signal if multiple pulses or portions of multiple pulses have been detected within said preselected time period.

The apparatus may include timing means which if only a single pulse has been detected within said preselected time period determines the width of said pulse.

The apparatus may include control signal generating means for generating a third type of control signal if said pulse is less than a predetermined threshold timing period and for generating a fourth type of control signal if said pulse is greater than said predetermined timing period.

The apparatus may be adapted wherein said first type of control signal is adapted to set said data processing system into a first mode of operation, and also wherein said second type of control signal is adapted to set said data processing system into a second mode of operation.

Another aspect of the invention herein is to provides a way to combine two (or more) different digital interface functions into a single circuit using the same set of input and output external pins. Normally, different circuit functions would require dedicated input/output pins. Advantages of the invention are such that when used in integrated circuits more functionality is available using the same number of pins, with the addition of this functionality being nearly transparent from a mode-to-mode perspective.

DESCRIPTION OF A SPECIFIC EMBODIMENT OF THE INVENTION

Figures 1, 1A:
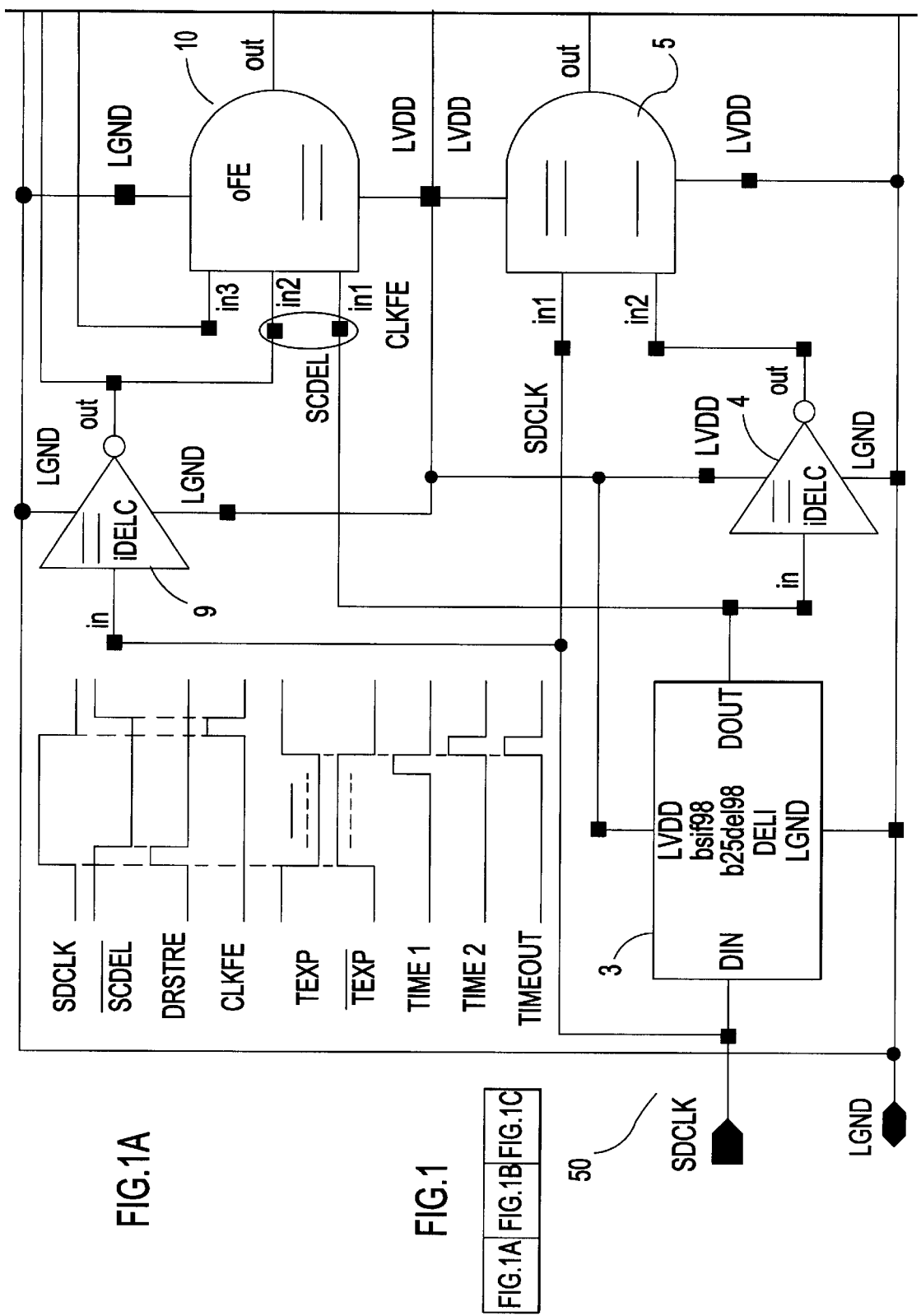
FIG. 1 is a schematic diagram of a discriminator circuit (legacy mode timer according to an embodiment of this invention.
Figure 1B:
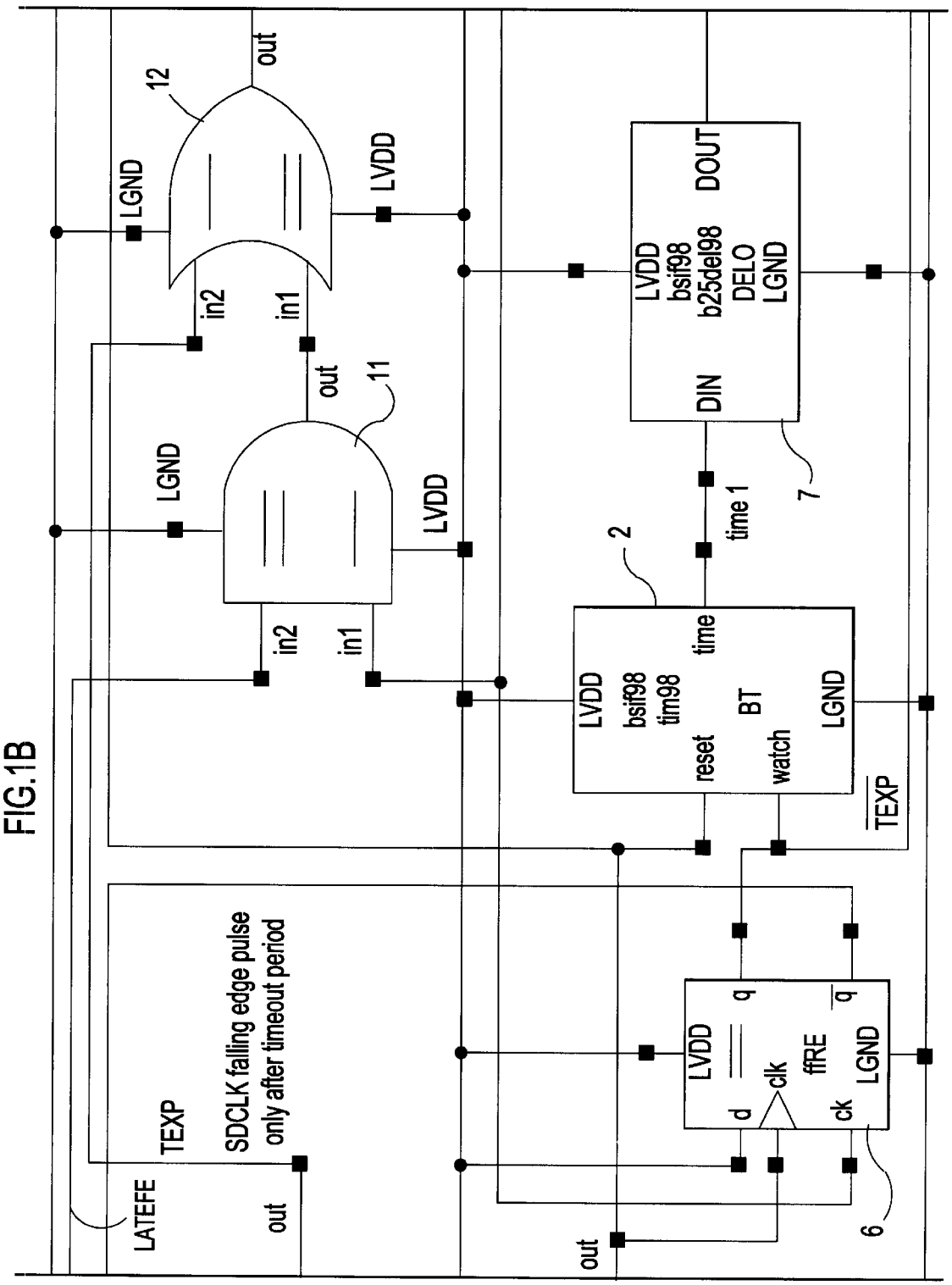
Figure 1C:
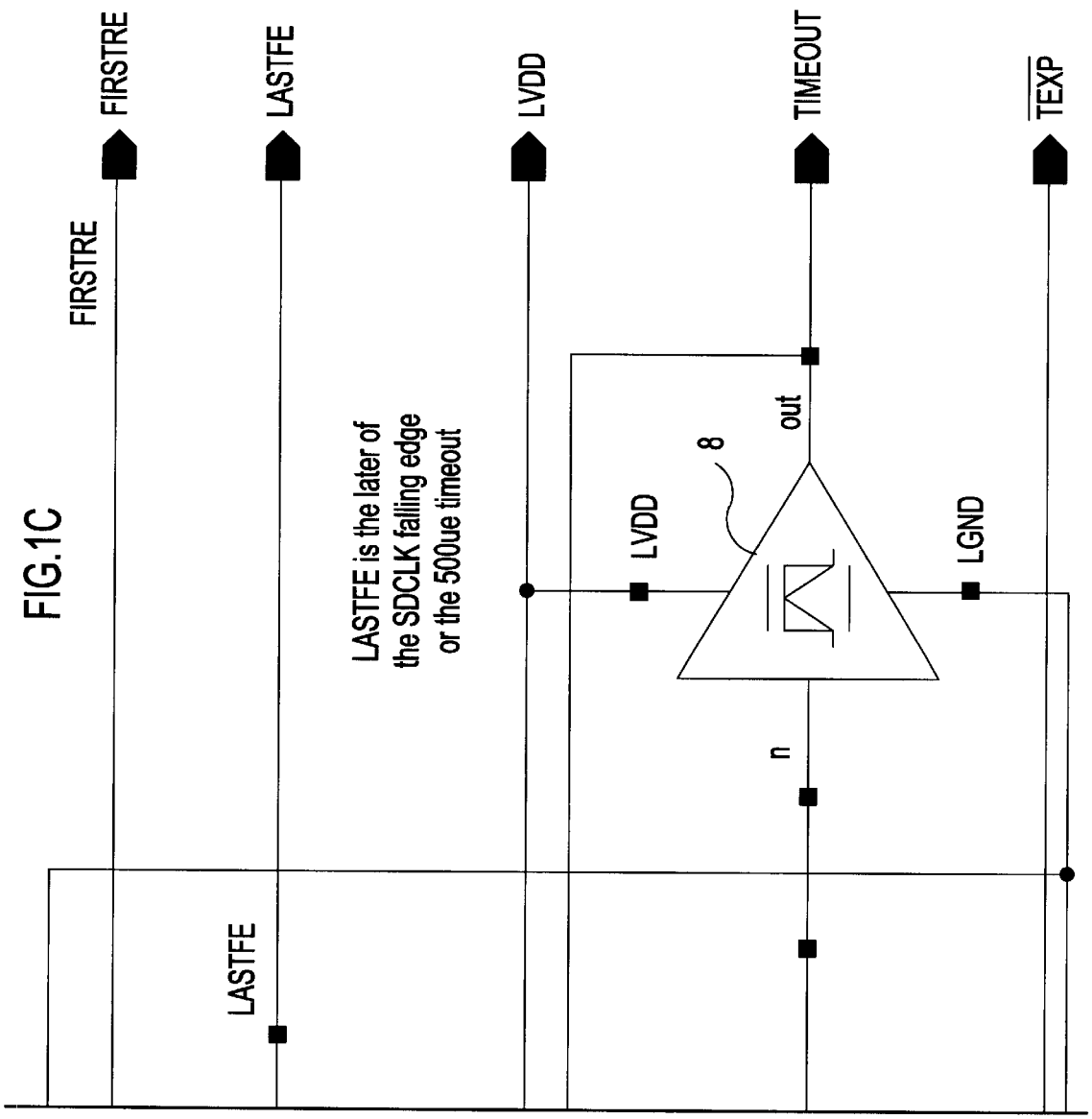
Figure 2B:
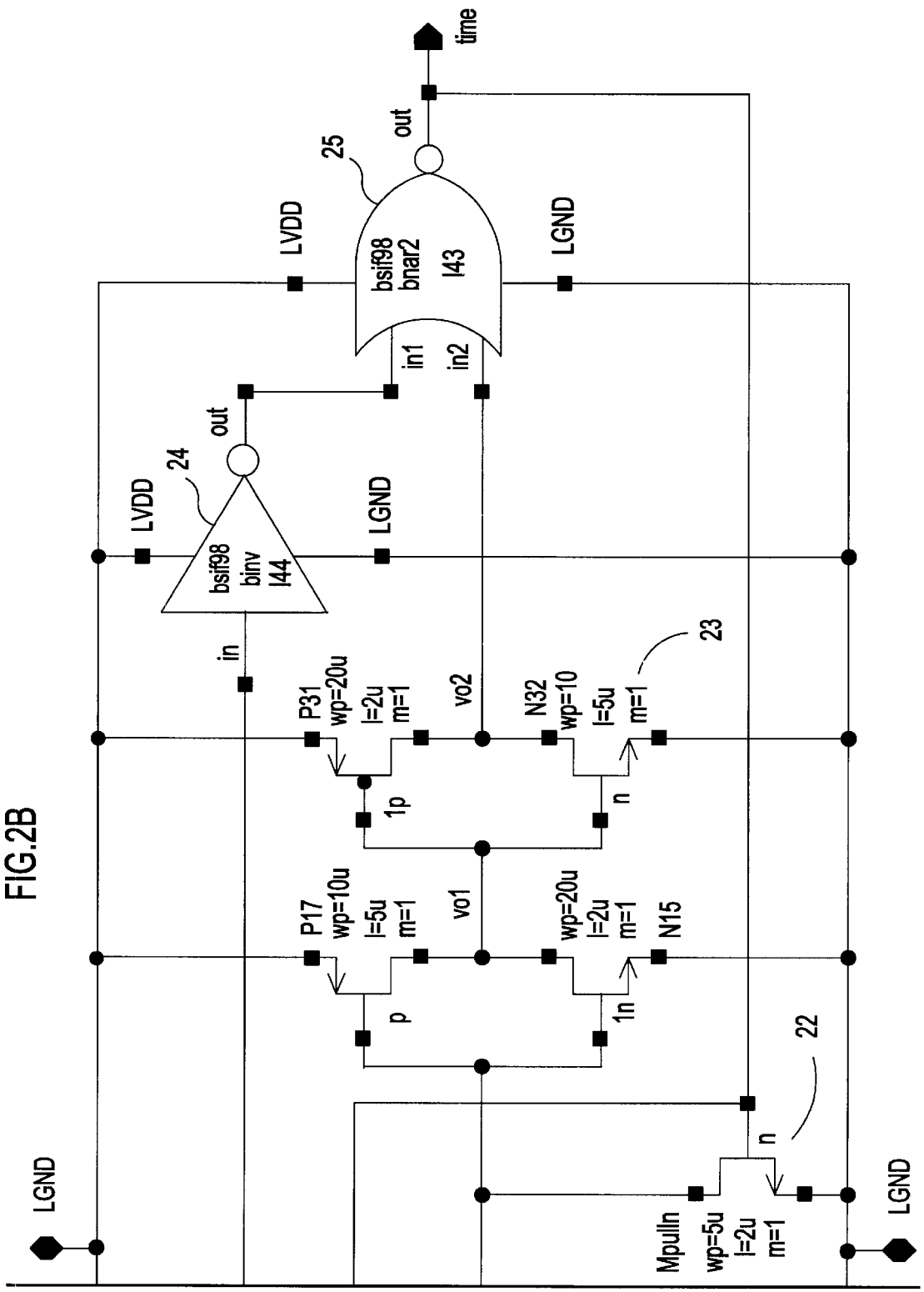
FIG. 2 is a schematic diagram of a timer circuit that is useful in the discriminator circuit illustrated in FIG. 1.
Figure 3B:
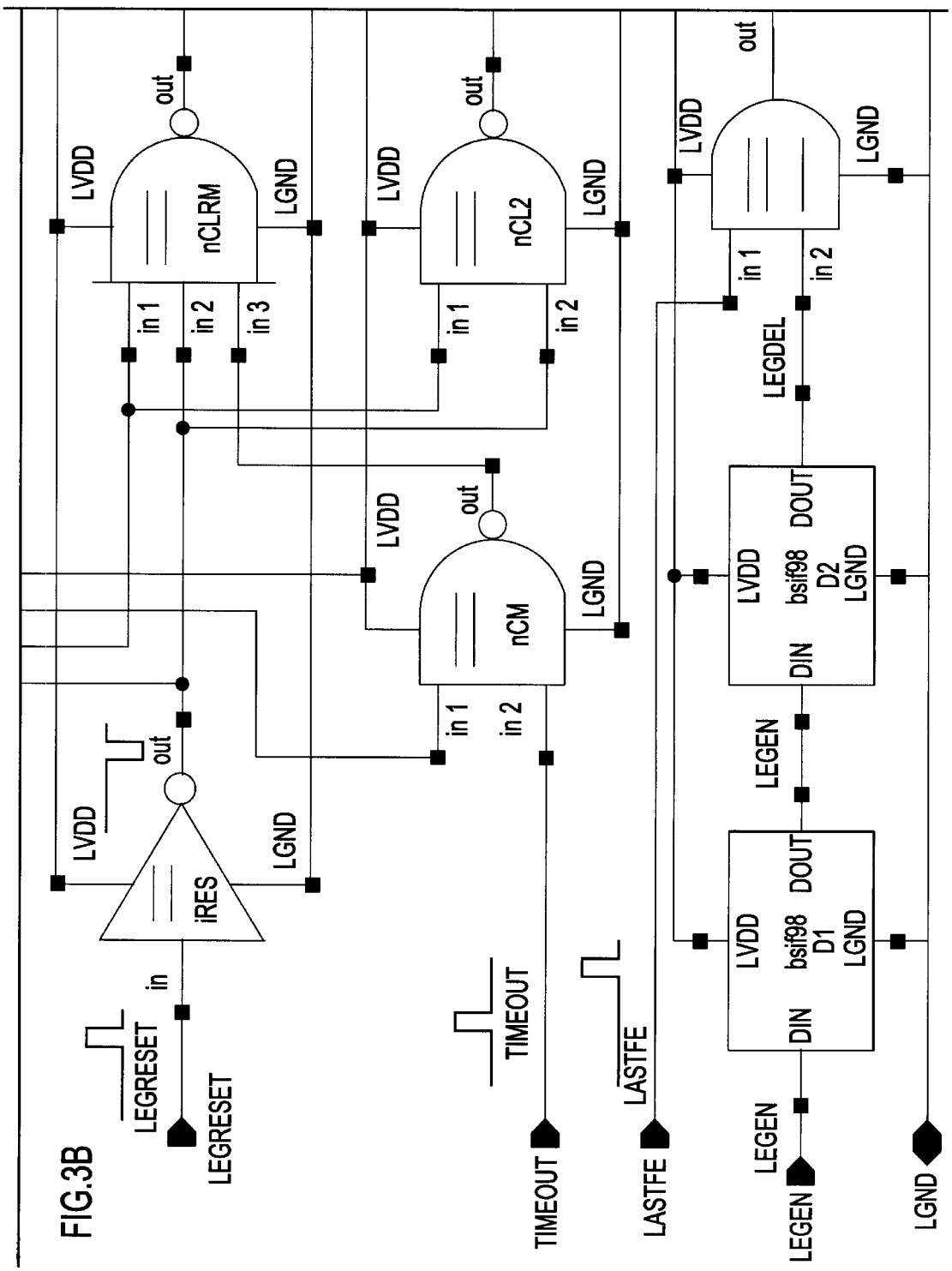
FIG. 3 is a schematic diagram of a (legacy mode acquisition) bandwidth circuit which may be used to set the mode of operation of internal interface circuits in accordance with an embodiment of the invention.
Figure 3C:
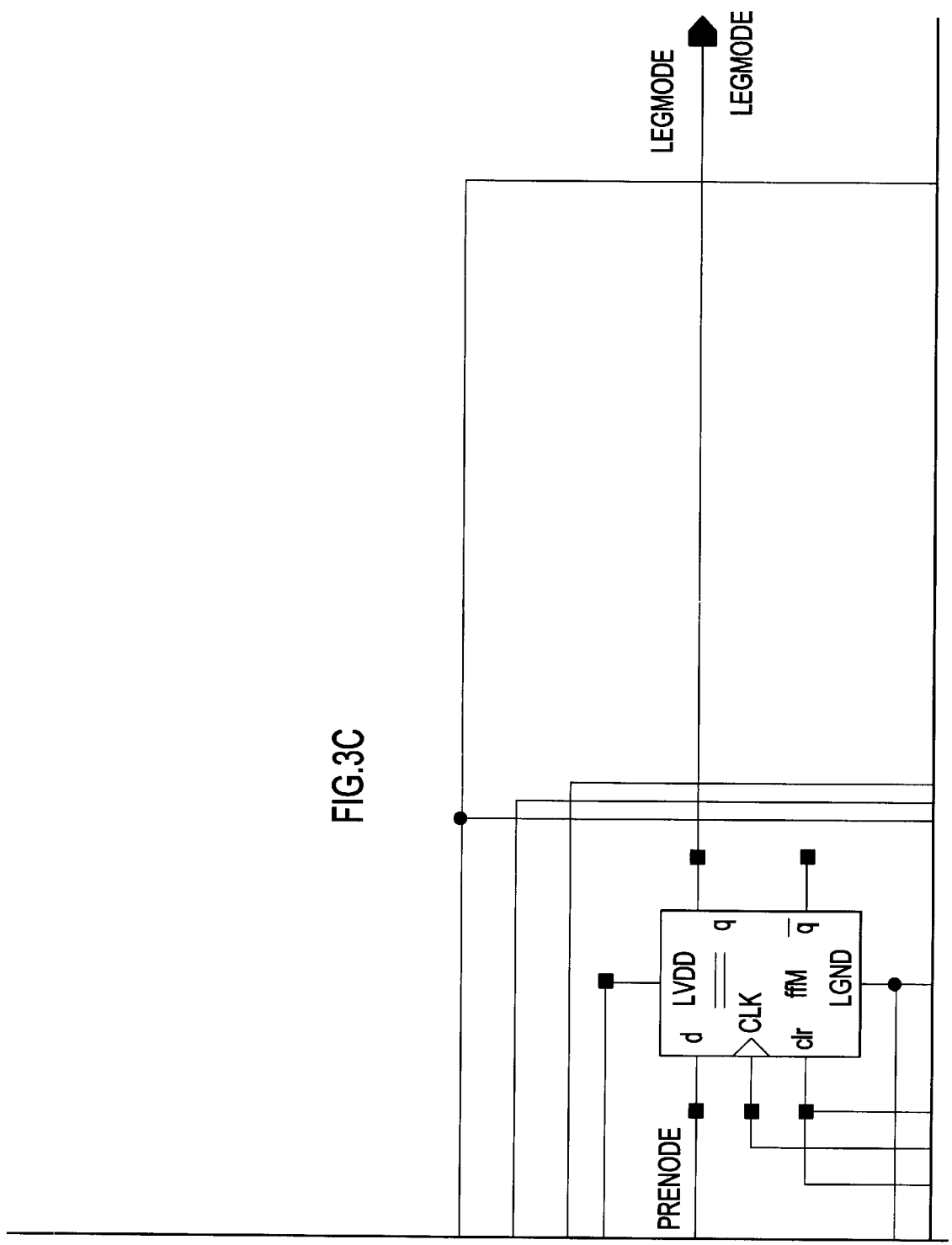
Figure 3D:
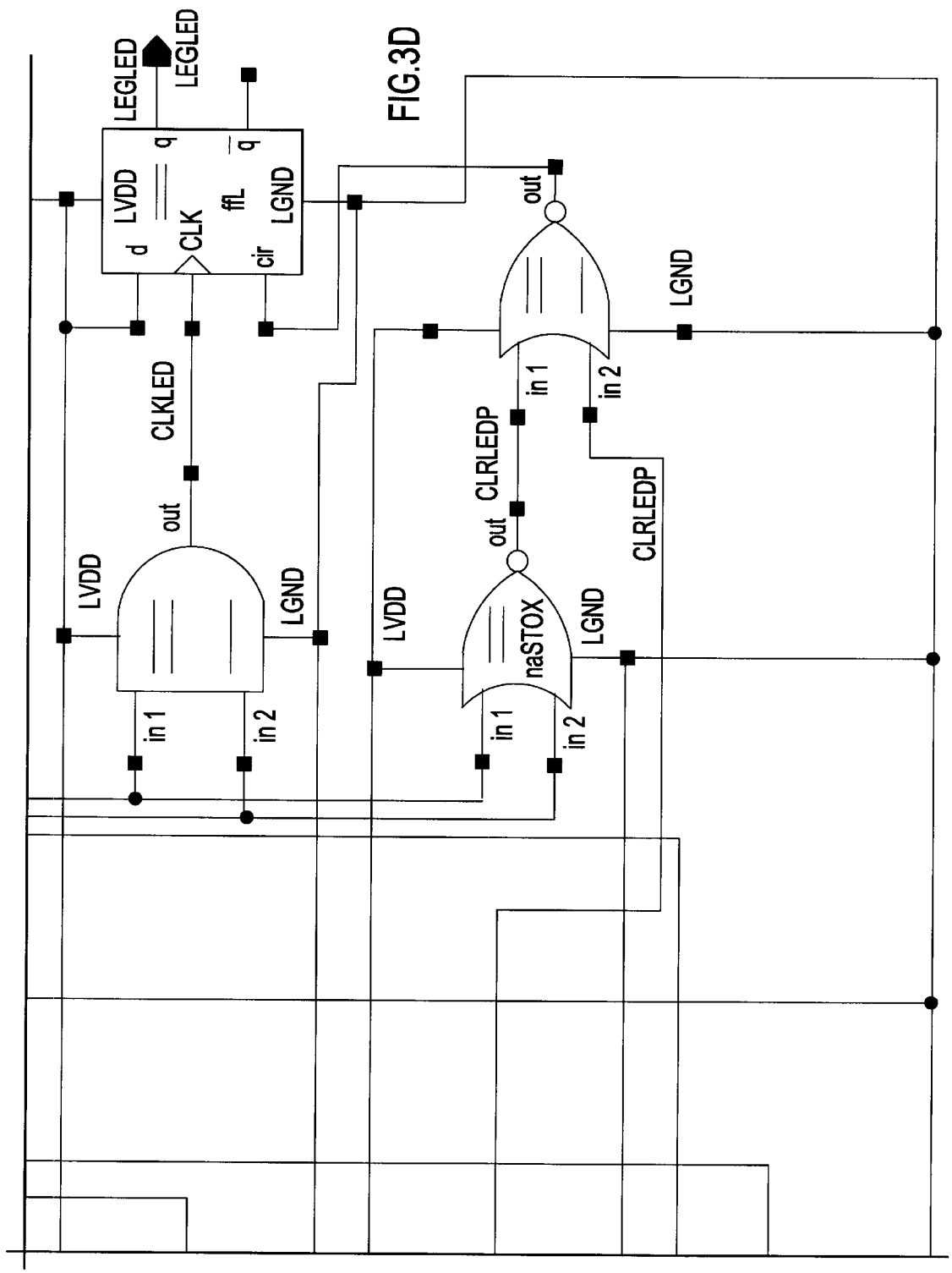

The invention herein achieves its advantages by discriminating between legacy and modern system applications. Legacy operations as performed by legacy programming or circuitry is usually performed slowly, eg. circuit shutdown for power saving, and selection of high or low bandwidth circuit operations are usually performed slowly, ie. between 10 and 100 μs (microseconds) in duration and at several hundred microseconds at closest repetition, while newer programming methods are capable of operating with faster programming sequences, ie. as fast as 100 ns repetition. We have found that by selecting an appropriate repetition time threshold it is possible to discriminate between legacy and more modern operations. It has been found that using a timing window of 500 μs for observing circuit or program operation the legacy system will produce at most one signal pulse in that window whereas new systems will produce several pulses. The SDCLK input of the circuit of FIG. 1 is used for the signal that is to be discriminated. The TXDATA input of the circuit of FIG. 3 is used for data input.

A general discussion of the operation of the discriminator timer circuit 1 depicted in FIG. 1 follows:

It detects the signal on input pin SDCLK, measures the pulse width of any pulses detected on the SDCLK pin, and measures the period of pulses on SDCLK pin (the distance between rising edges of the pulses). After a preselected time period (500 μs in our implementation) it times out and resets to an initial default waiting state so it can commence timing again. The circuit of FIG. 1 is operational on power up.

The pulse width of a signal is measured by measuring the time period between the rising and falling edges of a pulse (the leading and trailing portions). A buffer circuit is conveniently used for sharpening the rise and fall times of pulses rendering specific rise and fall times irrelevant. If only a single pulse or a portion of only a single pulse is detected on SDCLK within the preselected 500 μs timing period this indicates the input is of a legacy nature or protocol.

If the pulse width is found to be greater than the preselected time period chosen, in our case 500 μs, the discriminator provides additional information specifying that the SDCLK input is of a legacy nature and it has a lengthy pulse width.

If the pulse width is found to be less than the preselected time period, the discriminator provides additional information that the SDCLK input is of a legacy nature and it has a short pulse width.

If, on the other hand multiple pulses, (or rising edges) are detected within the 500 microsecond period then the input is of modern nature or protocol.

The invention provides a solution to combining several different functions to operate with a single set of input/output pins using timing discrimination: each of the various functions combined uses an exclusive window for timing constraints. If the various combined functions differ in timing requirements they can be combined in the fashion described above.

Referring to the embodiment of the invention depicted in FIGS. 1, and 3 respectively the circuitry illustrated responds to two input signals (SDCLK & TXDATA). Treatment of the SDCLK signal is fundamental to the operation of the discriminator circuit of FIG. 1. The discriminator circuit allows for a digital serial communication protocol to 'address' different functional blocks based on the frequency or duration of a signal applied to the SDCLK pin 50.

Although frequency division multiplexing (FDM), common to RF communication, offers a useful analogy as it maintains simultaneous communication links across a shared frequency band, as FDM assigns discrete sub-bands (or channels) within the band. Transmitters and receivers on the same channel can then communicate free of interference from transmitters and receivers on other channels.

While the analogy may bear some similarity it can be appreciated that the present invention can be conceived of using timing discrimination rather than frequency discrimination. One channel operates using timing discrimination using a threshold greater than 500 microseconds and is referred to as the legacy programming channel. The second channel, operating using signals with periodicity of less than 500 microseconds, is referred to as the digital serial interface programming channel. The two channels operate exclusively in time.

A significant feature of the invention is a frequency threshold detection circuit (timer 2 which uses a 500 μs timing threshold) which responds to activity on the SDCLK input pin. Two responses are possible depending on the frequency of the signal driven to the SDCLK input relative to the threshold of 500 μs (which corresponds to a threshold frequency of 2 kHz):

Frequency of rising edge transitions on the SDCLK input pin is greater than the threshold frequency:

Activity on SDCLK and TXDATA is processed as digital IR transceiver serial interface programming data as per the Serial Interface for Transceiver Control Draft 0.51 document published by the Infrared Data Association.

Rising edges of SDCLK strobe data carried on TXDATA into digital latches for processing as per the communication protocol defined in the above referenced document.

Frequency of rising edge transitions on the SDCLK input pin is less than the threshold frequency:

Activity on SDCLK and TXDATA is interpreted as 'legacy' mode bandwidth programming consistent with industry standard Fast Infrared transceivers Assertion of SDCLK for >500 μs initiates low power SHUTDOWN mode On the FALLING edge of SDCLK, the state of TXDATA is sampled and transceiver bandwidth is set accordingly:

| TXDATA State at SDCLK Falling Edge | Resultant Bandwidth |
|---|---|
| Logic HIGH | High |
| Logic LOW | Low |

Circuit and Implementation Details
Discriminator Circuit

Referring to FIG. 1, delay circuit DELI 3 delays the input SDCLK by 25 ns in this embodiment. Inverter 4 inverts the output signal of DELI to AND gate 5 which combines SDCLK and the inverted delayed signal from DELI 3 to generate the output FIRSTRE. On FIRSTRE going high Flip flop ffRE 6 latches Q High which provides the WATCH signal for timer 2 and the TEXP time expire signal. DELO 7 is a delay circuit that delays the timer output Q by 25 ns. Buffer circuit 8 buffers the TIMEOUT output. TIMEOUT presents an output pulse which is fed back to the clear input CLR of flip flop 6 ffRE. This clears Q which returns to 0 resulting in timer 2 being reset. 25 ns later TIMEOUT returns to 0.

Inverter 9 inverts input SDCLK. AND gate 10 produces a pulse on the falling edge of SDCLOCK only after the 500 μs period of timer 2 expires, ie. after the TIMEOUT pulse. AND gate 11 produces TIMEOUT pulse when SDCLOCK is low. The output of AND gate 11 when combined by OR gate 12 with the output of AND 10 gives the output LASTFE. If the pulse on SDCLK is very long, LASTFE will represent the falling edge of SDCLK, and if SDCLK falls within the timeout period and is not raised again, LASTFE will pulse with TIMEOUT. In both cases, LASTFE indicates legacy programming has been completed.

As can be seen discriminator circuit 1 responds to the SDCLK input and produces four output signals: FIRSTRE, LASTFE, TIMEOUT and TEXP-. The four signals produced by the Discriminator circuit 1 control the legacy shutdown circuit 52 and legacy mode acquisition circuit 51.

FIRSTRE(first rising edge)

This signal pulses for 25 ns following each rising edge of the SDCLK input.

LASTFE(last falling edge)

This signal pulses for 25 ns after the later of two events:
SDCLK falling edge or
Expiry of the 500 μs timer TIMEOUT (time expired pulse)

This signal pulses for approximately 25 ns as soon as 500 μs have elapsed from the last rising edge on the SDCLK input and the time has not been reset by an additional rising edge on SDCLK within the 500 μs time period. TEXP- (time expired, active low)

This signal is raised in response to a rising edge on the SDCLK input. It remains high until the TIMEOUT signal pulses at which point it is driven active (o) indicating time has expired.

500 μs Timer

The Timer Circuit 2 is triggered upon detection of a rising edge on the SDCLK input pin in the discriminator circuit. Beginning with the IDLE state (reset=0, watch=0), the operation of the circuit can be understood. In the IDLE state ie. the timer 2 is not timing, or is being reset, inverter TINV1 13 and NOR gate TOR 14 combine RESET and WATCH input signals to produce signal $V_{src}$=0 (ie. low) (It should be noted that $V_{src}$ is high when timing is being done). With $V_{src}$ low the output of inverter 24 will be high and the output TIME of NOR gate 25 will be low. When TIME is low it feeds back turning FET 16 on which makes it possible for new timing sequence to begin. When TIME is low FET 22 is off. The use of FET 22 and FET 16 stop power consumption when TIMEOUT has occurred. As such, FET Mpullp 21 is on and signal captop is driven to the level of LVDD (the power supply rail) raising the voltage of timing capacitor $C_{time}$ 20 to LVDD. Two inverter formed by the FET pairs (P17,N15) and (P31,N32) (collectively referred to as threshold circuit 23) replicate the logic level (high) on signal captop to signal vo2 input to NOR gate 143. NOR gate 143, responding to vo2=HIGH, forces the output signal Time to logic low (0). This, for completeness, reinforces the assertion of captop to the level LVDD by ensuring that the FET Mpulln 22 is disabled. This defines the first stable operating state of the timer circuit: IDLE MODE.

When the WATCH input signal is raised, mirror circuit 15 discharges timing capacitor $C_{time}$ 20 in a linear manner when enabled by $V_{src}$ from NOR gate 14 going high. The ratio of sizes of FET 18 to FET 17 in combination with resistance 19 sets the discharge current through FET 18 which in combination with the value of $C_{time}$ 20 determines the discharge time, and hence the time out.

As stated above FET 21 charges $C_{time}$ 20 up to the supply voltage after reset, or when timing is not occurring, ie. whenever RESET is high or when WATCH is low. The result is the voltage on $C_{time}$ is held high while waiting for timing to begin.

Threshold circuit 23 is comprised of a low switchpoint inverter comprising FETs P17, and N15, and a high switchpoint inverter comprising FETs P31, and N32. The voltage input to threshold circuit 23 (approximately 0.6V) is the voltage present on capacitor $C_{time}$ 20, which when it drops below the threshold (less than 1 volt) of the first inverter, Vo1 starts to go high, and at the switch point of the second inverter then Vo2 starts to go low. The effect of the threshold circuit allows the overall circuit size to be kept down while allowing a relatively long discharge time. This is important for small circuit sizes.

When Vo2 crosses the threshold of NOR gate 25 if $V_{src}$ is still high then TIME goes high. This output is used by discriminator 1 for discrimination of signals, and is also used to fully discharge $C_{time}$ 20 through FET 22, and to disengage current mirror 15 using FET 16. To help eliminate power consumption.

The arrival of a rising edge of a signal on the SDCLK 50 forces (via external circuitry not illustrated) the assertion of the timer input signal Watch to logic HIGH (1). The NOR gate TOR 14 now being driven by the logic levels (0,0) at it's inputs, forces the $V_{src}$ signal to a high (1) state. The PFET Mpullp 21 is thereby disabled, and the NFET Mton 16 is allowed to conduct a current through resistor Rbias 19 and NFET Mbias 17 to ground. This current is then mirrored through NFET Mramp 18 resulting in a linearly decreasing voltage on the circuit node captop. At the switching threshold of the inverter formed by the FET pair (P17,N15), the node vo1 changes levels from low (0) to high (1). Similarly, node vo2 changes from high (1) to low (0). At this point, NOR gate 143 is being driven by logic levels (0,0) at it's inputs, and as such asserts the signal time to a logic high (1). The assertion of Time=1 discharges any remaining voltage on the node captop through NFET Mpulln 20, and disables the reference current path through NFET Mton 16. This defines the second stable operating state of the timer circuit: EXPIRED MODE.

Subsequently, via external circuitry (not illustrated), the assertion of time=1 feeds back to deassert the Watch input to a logic low (0) state. NOR gate TOR 14 senses (0,1) at its inputs and sets vsrc=0. Through inverter 144 and NOR gate 143, the signal time is then forced to logic low (0) to disable the NFET Mpulln 20 and allow PFET Mpullp 21 to force captop to a logic high (1). Inverter 23 formed by the FET pairs (P17,N15) and (P31,N32) replicate the logic high state of captop to the signal vo2. The circuit has reentered IDLE MODE.

Legacy Mode Acquisition Circuit

Referring to FIG. 3 the legacy mode acquisition circuit 51 in this embodiment of the invention is shown. This circuit is illustrative of adaptations of the invention. For instance, on the detection of legacy mode signals this circuit can be used to set the mode of operation of an infrared receiver eg. high or low bandwidth, corresponding to Fast (FIR) or Slow (SIR) infrared data reception.

Circuit 51 watches for and captures transitions on SDCLK and TXDATA which represent legacy mode bandwidth switching operations compatible with industry standard legacy devices. The circuit responds to input signals: FIRSTRE, SDCLK, TXDATA, POR, LEGRESET, TIMEOUT, LASTFE and LEGEN.

POR and LEGRESET are effectively reset signals which ensure the circuit powers up into the correct state.

The LEGEN control signal is asserted when Legacy programming activity is valid (i.e. rising edge transitions on the SDCLK input exceed 500 µs in repetition rate).

Signals FIRSTRE, SDCLK, TXDATA, TIMEOUT and LASTFE serve to validate, capture and store signal transitions which define the legacy bandwidth switching operation.

The output signals LEGMODE and LEGLED, are produced. LEGMODE can be used for a number of purposes, eg. to set the bandwidth of an infrared receiver circuit (not shown) which it can govern. LEGLED also can be used for another purpose as desired. They are only asserted when the appropriate legacy programming sequences are detected and the frequency detected on the SDCLK pin is below the 2 kHz threshold, ie. the pulse length or repetition period of pulses exceeds 500 µs).

The TIMEOUT output is used to signal which type or speed of programming is being used, ie. legacy or more modern. TIMEOUT can be used to route incoming data to the appropriate digital circuits; legacy data to legacy type circuitry, and more modern data to modern circuitry.

A convenient method of achieving this when controlling modern high speed circuitry and legacy circuitry is to keep the high speed circuitry operational except when reset by the TIMEOUT signal to a wait state. The low speed, or legacy circuitry action can be hidden until activated by the TIMEOUT signal. The high speed circuit will return to operation the next time SDCLK goes high.

Legacy Shutdown Circuit

Figure 4:
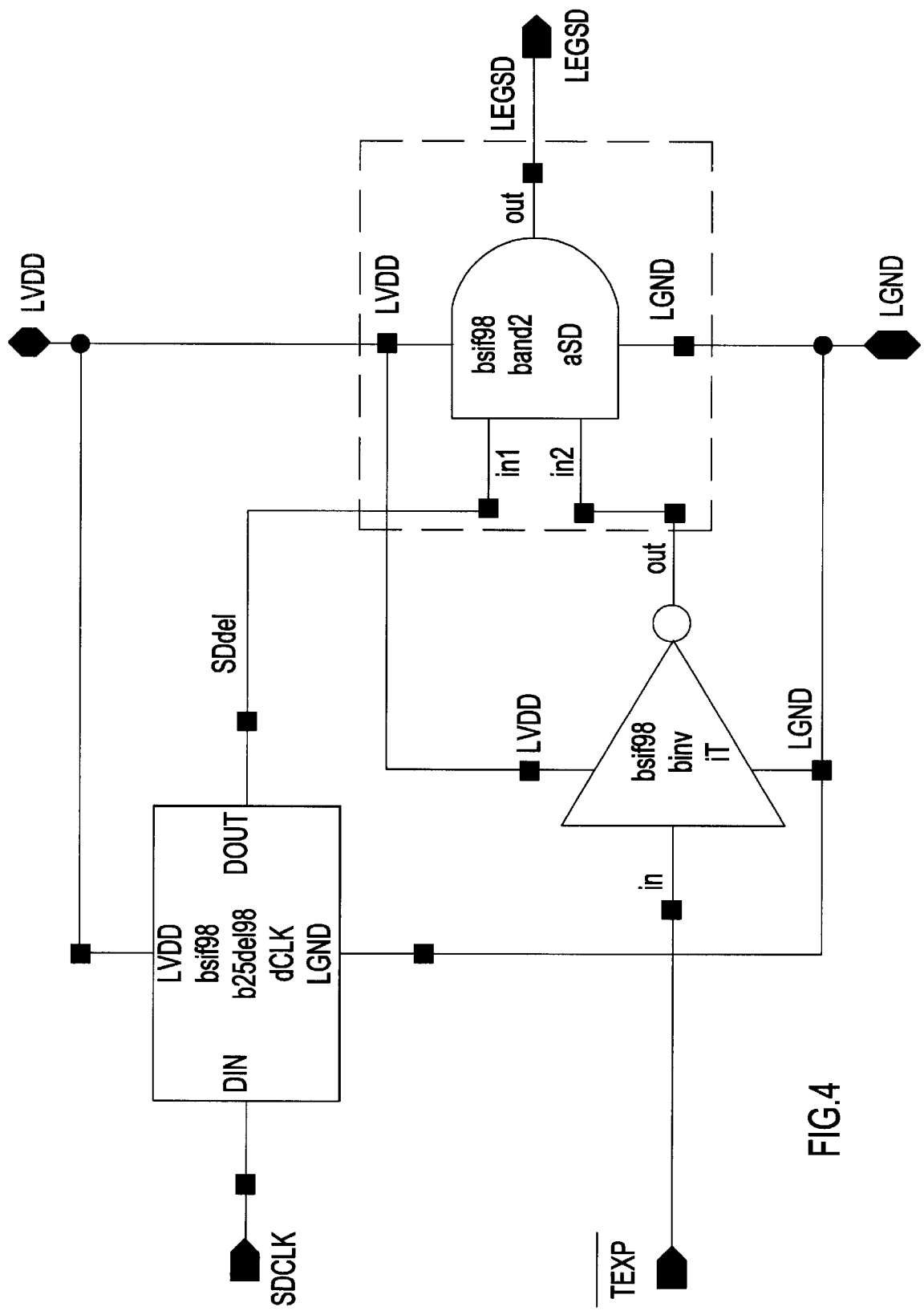
FIG. 4 is a schematic diagram of a legacy shutdown circuit in accordance with an embodiment of the invention.

Referring to FIG. 4, the legacy shutdown circuit in this embodiment of the invention is shown. When SDCLK=1 and TEXP—falls to 0 after a timeout, the LEGSD signal is asserted high and thereby places the infrared receiver into low power shutdown mode. This occurs when the SDCLK input has been asserted high for a period of time in excess of 500 µs (which precludes SDCLK activity≧=2 kHz) before the transceiver's legacy shutdown mode is enabled.

This is illustrated as another application of the invention, such as the invocation of power saving when specific outputs are used from the discriminator 1.

Figure 5:
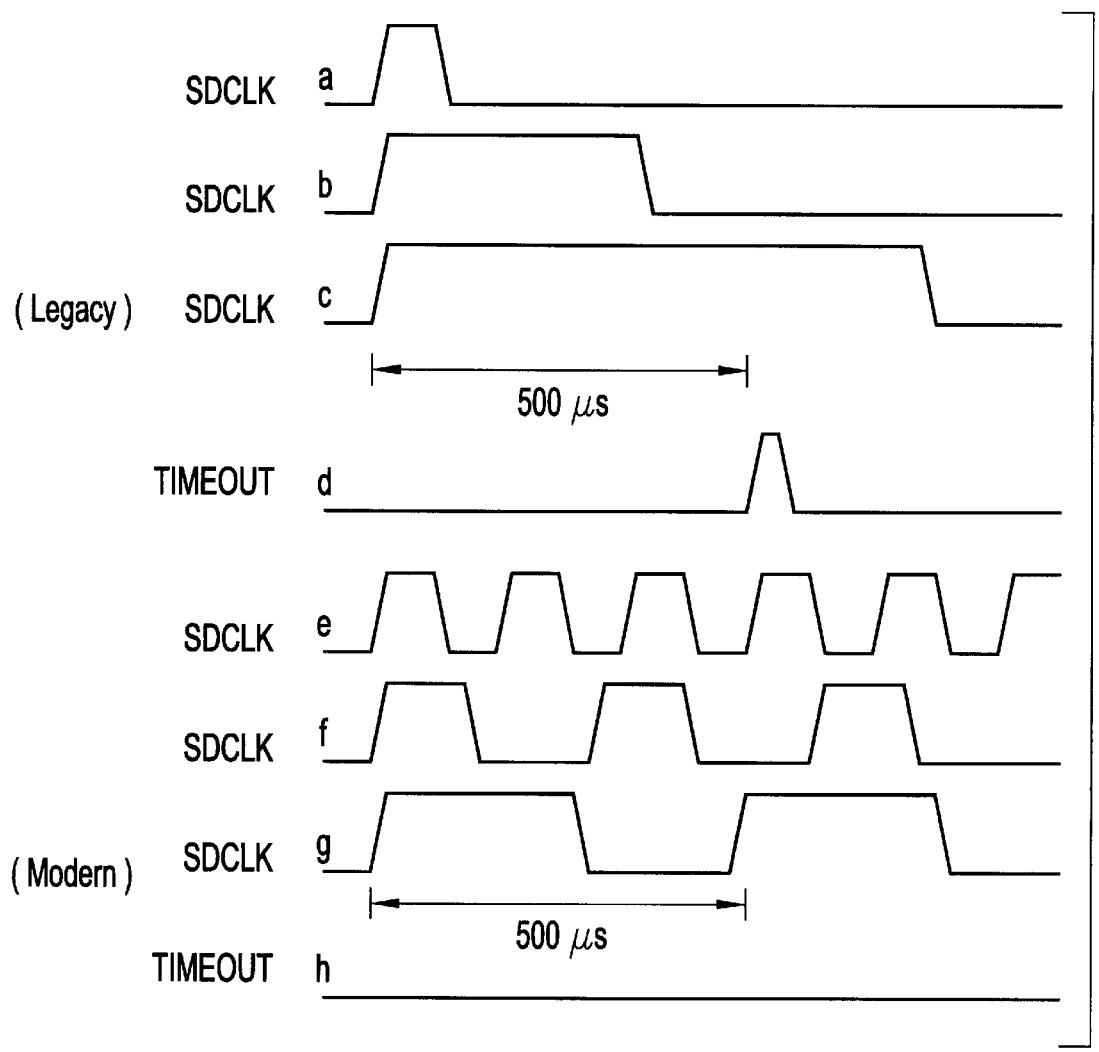
FIG. 5 is a timing illustration of SDCLK signals input to the discriminator circuit representing legacy and newer high speed data signals.

FIG. 5 depicts various SDCLK signals input to the discriminator 1 and corresponding timeout signal generation. Traces a and b depict legacy pulses of length PW shorter than the discrimination threshold period. Trace c depicts a legacy pulse of length greater than the discrimination period. As can be seen when legacy pulses are detected, a TIMEOUT pulse is generated 500 µs after the first rising edge of SDCLOCK Traces e, f and g represent more modern high speed signals. For faster (modern) programming sequences no TIMEOUT pulses are generated because the timer has been reset by detection of multiple rising edges or SDCLOCK in the 500 µs window.

Figure 6:
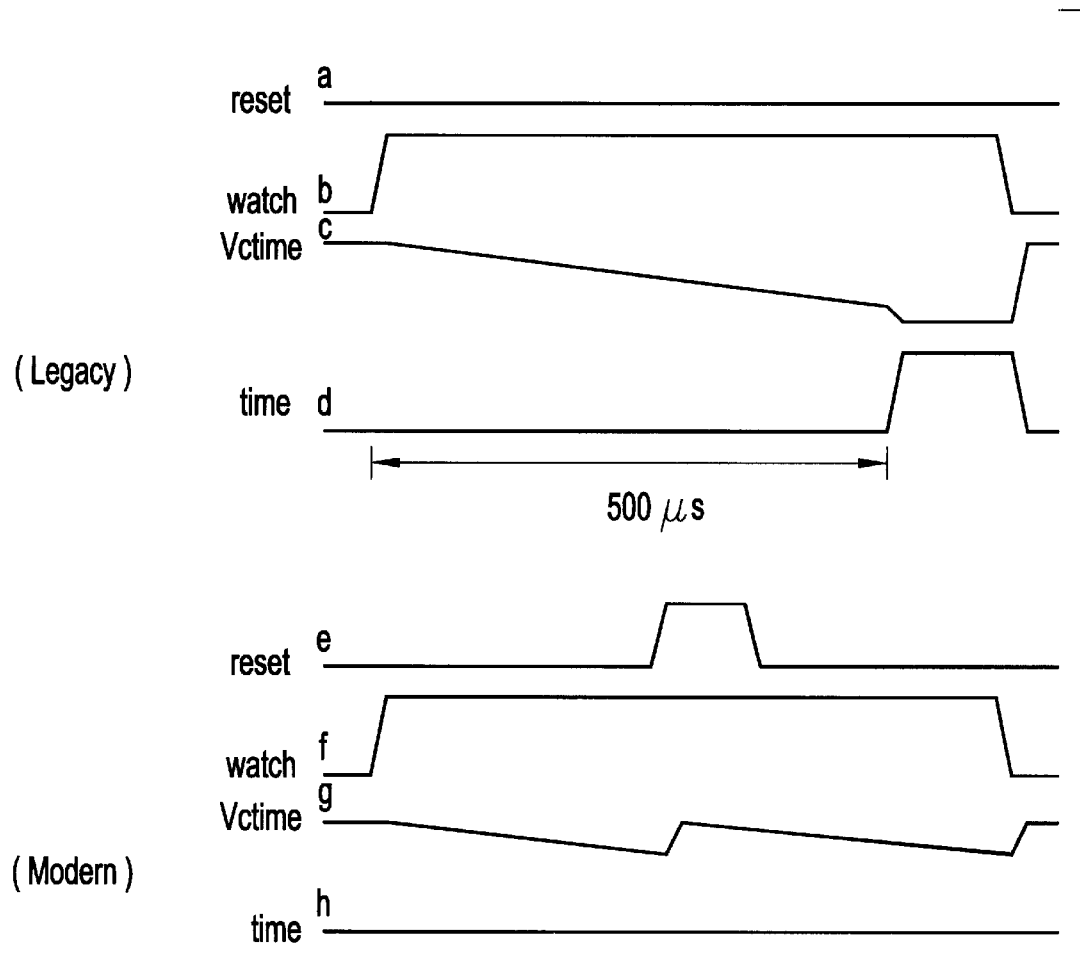
FIG. 6 is a timing illustration of the operation of the timer circuit of FIG. 2.

FIG. 6 depicts timing traces for the RESET and WATCH signals, the voltage $V_{Ctime}$ on Ctime and also the TIME signal. Traces a, b, c, and d, illustrate the timing waveforms for typical legacy input programming. When WATCH is asserted high, the voltage on timing capacitor $C_{time}$, $V_{Ctime}$ falls until 500 µs later, a TIME pulse is generated. At this time, $V_{Ctime}$ is grounded to reinforce the timeout and reduce power consumption. The time signal d remains high until the watch signal b is lowered.

Traces e, f, g and h, illustrate the timing waveform for typical modern input programming. When watch is asserted, $V_{Ctime}$ again begins to decay, but is reset high upon receipt of a rest signal of the kind typically received when multiple rising edges are detected by the discriminator circuit of FIG. 1. No time signal is generated as a TIMEOUT never occurs.

The ability to use the discriminator circuit 1 to communicate information to a receiver controlled by 2 distinct signal protocols (a long duration, or slow legacy signal, or high repetition rate (fast) signal) has been demonstrated. When the signaling rate on the SDCLK input is <2 kHz (i.e. rising edges greater than 500 µs apart), the events are interpreted as 'Legacy Mode Operations' and the receiver operated by the circuit of the invention appears (from the outside) to behave identically to a legacy device. When the signaling rate on the SDCLK input is >2 kHz, events are interpreted as serial programming interface operations and the enhanced functionality of a newer generation device is available.

As discussed above it may be seen that the invention may be applied to a digital interface circuit that is within a larger circuit such as an infrared receiver circuit. A serial interface according to the invention may allow two types of receiver programming: a very slow simple programming method (a legacy method) that accomplishes only three functions and is backward compatible with older receivers; and a new faster programming protocol which provides greater functionality by allowing many aspects of the transceiver to be customized.

Alternatives

As will be appreciated by those skilled in the art the method of the invention could be scaled to envision multiple non-overlapping timing bands to which different functional circuit blocks respond For instance the discriminator could be adapted to discriminate between several signals, for instance, by using multiple timers having different threshold timing periods, eg. 100, 200, 300, 400, 500 microseconds. Alternatively a single timer with multiple threshold circuits 23 could implement several timing threshold periods.

What is claimed is:

1. In a data processing system a method of discriminating between digital signals of a plurality of different rates by monitoring the pulse width and repetition rate of such signals comprising:

monitoring said digital signals for a preselected period of time;

determining whether only a single pulse or multiple pulses have been detected within said preselected time period;

if only a single pulse or a portion thereof has been detected within said preselected time period generating a first type of control signal;

if multiple pulses or portions of multiple pulses have been detected within said preselected time period generating a second type of control signal, wherein if only a single pulse has been detected within said preselected time period determining the width of said pulse.

2. The method of claim 1 wherein if said pulse is less than a predetermined threshold timing period generating a third type of control signal, and if said pulse is greater than said predetermined timing period generating a fourth type of control signal.

3. Apparatus for controlling a data processing system adapted to operate in a plurality of modes of operation for processing digital signals of a plurality of rates by selecting modes of operation of said system comprising:

means for monitoring said digital signals for a preselected period of time;

discrimination means for determining whether only a single pulse or multiple pulses have been detected within said preselected time period;

control signal generating means for generating a first type of control signal if only a single pulse or a portion thereof has been detected within said preselected time period;

control signal generating means for generating a second type of control signal if multiple pulses or portions of multiple pulses have been detected within said preselected time period; and timing means which if only a single pulse has been detected within said preselected time period determines the width of said pulse.

4. The apparatus of claim 3 including control signal generating means for generating a third type of control signal if said pulse is less than a predetermined threshold timing period and for generating a fourth type of control signal if said pulse is greater than said predetermined timing period.

* * * * *